US007006503B1

(12) United States Patent
Lee

(10) Patent No.: US 7,006,503 B1
(45) Date of Patent: Feb. 28, 2006

(54) METHOD FOR MATCHING UPPER PROTOCOL LAYER TO HIGH SPEED SERIAL BUS

(75) Inventor: Hee-jin Lee, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 978 days.

(21) Appl. No.: 09/603,615

(22) Filed: Jun. 26, 2000

(30) Foreign Application Priority Data

Aug. 27, 1999 (KR) ............................... 1999-35835

(51) Int. Cl.
*H04L 12/28* (2006.01)
*H04L 12/66* (2006.01)
*H04L 12/403* (2006.01)
*H04J 3/16* (2006.01)

(52) U.S. Cl. ................. 370/395.52; 370/469; 370/470; 370/352; 370/451

(58) Field of Classification Search ............ 370/395.52, 370/400, 351, 469, 352, 470, 465, 466, 467, 370/471, 431, 410, 451
See application file for complete search history.

(56) References Cited

U.S. PATENT DOCUMENTS

| | | | | |
|---|---|---|---|---|
| 5,706,439 A | * | 1/1998 | Parker | 370/234 |
| 5,815,492 A | * | 9/1998 | Berthaud et al. | 370/234 |
| 6,101,613 A | * | 8/2000 | Garney et al. | 713/600 |
| 6,324,178 B1 | * | 11/2001 | Lo et al. | 370/392 |
| 6,351,465 B1 | * | 2/2002 | Han | 370/395.43 |
| 6,360,287 B1 | * | 3/2002 | Kawamura | 710/61 |
| 6,590,865 B1 | * | 7/2003 | Ibaraki et al. | 370/230 |

* cited by examiner

*Primary Examiner*—Hanh Nguyen
(74) *Attorney, Agent, or Firm*—Sughrue Mion, PLLC

(57) ABSTRACT

A method for matching an upper protocol layer to a high speed serial bus is provided. The method includes the steps of (a) determining whether the length of the data packet transferred from an upper layer to a node of the high speed serial bus is no less than a predetermined length, (b) allocating a channel of the bus and transferring data by an isochronous transfer service when it is determined that the length of the data packet is no less than the predetermined length, and (c) transferring data by an asynchronous transfer service when it is determined that the length of the data packet is less than the predetermined length. According to the above method, it is possible to match an existing communications application where it is not specified which service of the high speed serial bus is to be used to the high speed serial bus, while maintaining transparency of communication protocol and to effectively use the channel resources of the bus.

20 Claims, 4 Drawing Sheets

METHOD FOR MATCHING UPPER PROTOCOL LAYER TO HIGH SPEED SERIAL BUS

BACKGROUND OF THE INVENTION

1. Field of the Invention

The present invention relates to a method for matching an upper protocol layer to a high speed serial bus, and more particularly, to a method for matching the upper protocol layer to the IEEE 1394 bus in order to effectively transfer data packets of an existing communications application to the IEEE 1394 bus, while maintaining transparency of the data packets.

2. Description of the Related Art

The IEEE 1394 bus which is a high speed serial bus allows real-time data transfer for a multimedia application. The IEEE 1394 bus provides an asynchronous service, an isochronous stream service, and an asynchronous stream service. In this specification, the isochronous stream service and the asynchronous stream service are collectively called a stream service.

FIG. 1 shows a communications layer for serving a general data communications application such as a file transfer protocol (FTP) and data flow when packets are transferred by the asynchronous service. Referring to FIG. 1, for example, data packets made by an existing communications application based on the TCP/IP of an asynchronous method such as the Internet do not specify a subaction type provided by the 1394 link. Therefore, the communications application of an upper layer is not effectively matched to the IEEE 1394 bus.

In order to match the communications application of the upper layer to the IEEE 1394 bus, it is possible to transfer data by the asynchronous service, considering that all the data packets sent by the upper layer correspond to asynchronous subaction or to transfer data by the isochronous stream service, considering that all the data packets correspond to isochronous subaction.

However, in the former case, it is difficult to effectively manage the 1394 serial bus resource. Namely, it is easy to load data provided by a connectionless oriented service such as the Internet protocol (IP) on the 1394 asynchronous packet. However, in a circumstance where few applications actively use the IEEE 1394 isochronous/asynchronous stream, the 1394 channel cannot be effectively utilized. Also, when asynchronous packets are congested in the circumstance where the isochronous service is commonly used, a basic cycle (125 ms) of the 1394 bus cannot be maintained. Accordingly, the isochronous service becomes unstable.

In the latter case, a limited channel source is wasted since channels are allocated to all connections or channels are allocated even when the amount of data is small. Accordingly, an overload may occur since channel capacity is exceeded.

SUMMARY OF THE INVENTION

To solve the above problem, it is an object of the present invention to provide a method for effectively matching a communications application of an upper layer to a high speed serial bus.

Accordingly, to achieve the above object, according to one aspect of the present invention, there is provided a method for matching an upper protocol layer to a high speed serial bus, comprising the steps of: (a) checking whether the length of a packet transferred from an upper layer to a node of the high speed serial bus is no less than a predetermined length, (b) allocating a channel of the bus and transferring data through the channel by an isochronous transfer service when it is determined that the length of the packet is no less than a predetermined length in the step (a), and (c) transferring the data by an asynchronous transfer service when it is determined that the length of the packet is less than a predetermined length in the step (a).

The predetermined length is preferably a maximum transfer unit (MTU) defined by the TCP/IP protocol in the step (a).

The step (a) is preferably performed in the IP 1394 layer and the IP 1394 layer preferably comprises a channel Matron for performing the step (a) and an address resolution protocol (ARP) 1394 layer.

The high speed serial bus preferably meets the requirements of the IEEE 1394 standard.

According to another aspect of the present invention, there is provided a method for matching an upper protocol layer to a high speed serial bus, comprising the steps of (a) determining whether the length of the data packet transferred from an upper layer to a node of the high speed serial bus is no less than N×MTU wherein N is a positive number which is smaller than 1 and MTU is the maximum transfer unit defined by the TCP/IP protocol, (b) determining that the data packet is stream data, allocating a channel of the bus, and transferring data by an isochronous transfer method when it is determined that the length of the data packet is no less than N×MTU, and determining that the data packet is not the stream data and transferring data by an asynchronous transfer method when it is determined that the length of the data packet is less than N×MTU.

According to another aspect of the present invention, there is provided a method for matching an upper protocol layer to a high speed serial bus, comprising the steps of (a) determining whether a data packet whose length is a MTU is received from an upper layer to a predetermined node no less than a predetermined number of times for a predetermined time, (b) determining that input data is stream data, allocating the channel of the bus, and transferring data by an isochronous transfer method when it is determined that the data packet whose length is the MTU is received no less than the predetermined number of times for the predetermined time in the step (a), and (c) determining the input data is not the stream data and transferring the data by an asynchronous transfer method when it is determined that the data packet whose length is the MTU is received less than the predetermined number of times for the predetermined time in the step (a).

Also, the above method preferably further comprises the step of determining the input data is not the stream data, returning the allocated channel, and transferring the data by the asynchronous transfer method when it is determined that the data packet whose length is the MTU is received less than the predetermined number of times for the predetermined time in the step (a).

According to another aspect of the present invention, there is provided a method for matching an upper protocol layer to a high speed serial bus, comprising the steps of (a) waking up a timer process at predetermined time intervals, (b) determining whether the current entry corresponds to the end of a Matron note, (c) letting the timer process sleep when the entry corresponds to the end of a Matron note and waking up the timer process after the lapse of a predetermined time, (d) reading a "status" field which displays the status of the entry and checking whether the "status" field is in an 'invalid' state when the entry does not correspond to the end of the Matron note, (e) proceeding to a next entry when the "status" field is in the 'invalid' state and jumping to the step (b), (f) decreasing a time-to-live (TTL) value when the "status" field is not in the 'invalid' state, (g) determining whether the reduced TTL value is larger than 0, and (h) transiting the "status" field to the 'invalid' state and returning the allocated channel when it is determined that the TTL value is not larger than 0 in the step (g).

BRIEF DESCRIPTION OF THE DRAWING(S)

The above object and advantages of the present invention will become more apparent by describing in detail a preferred embodiment thereof with reference to the attached drawings in which.

DESCRIPTION OF THE PREFERRED EMBODIMENTS

Figure 1:
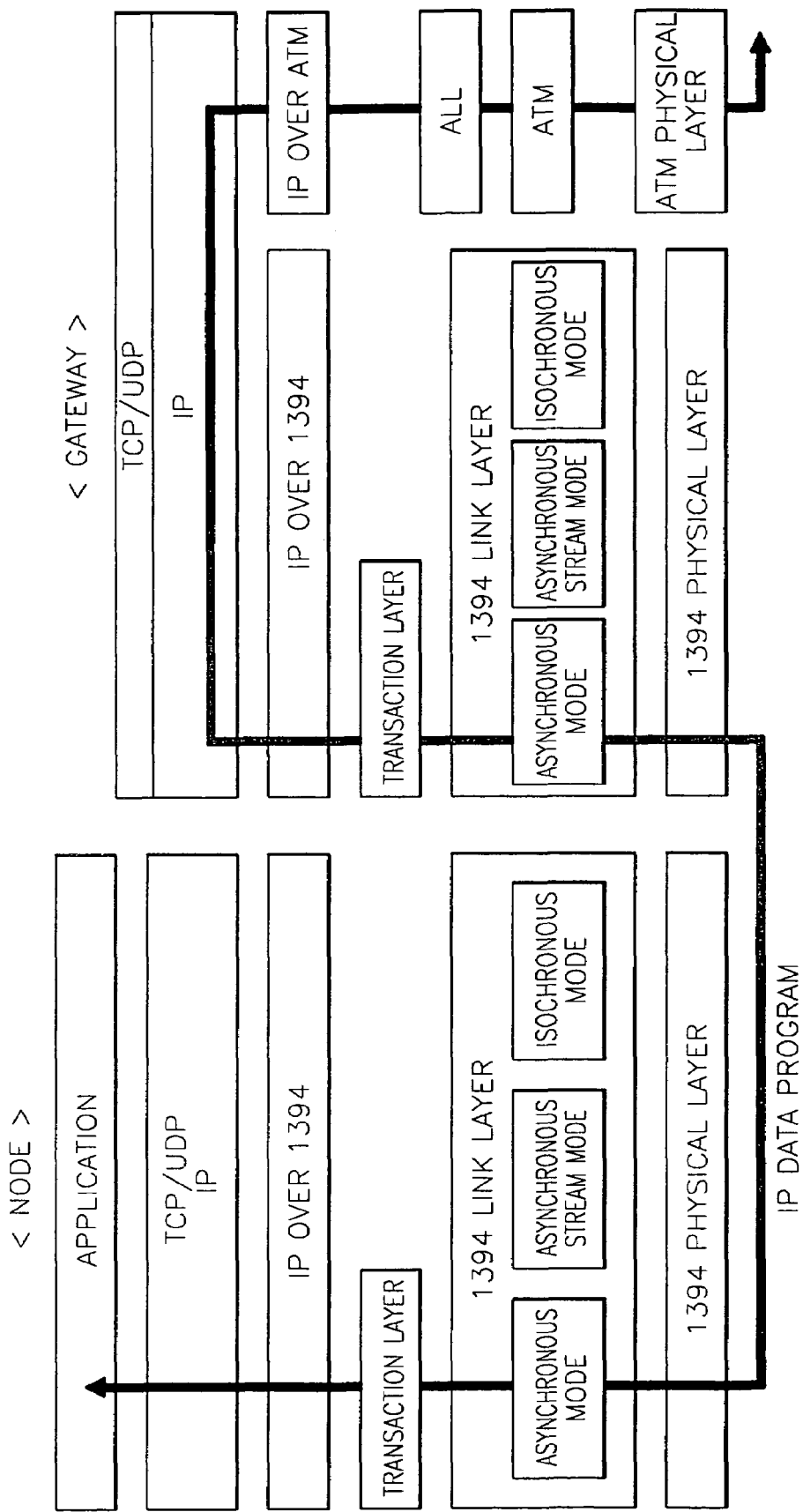
FIG. 1 shows a communications layer for serving a general data communications protocol such as a file transfer protocol (FTP) and data flow when packets are transferred by an asynchronous service.
Figure 2:
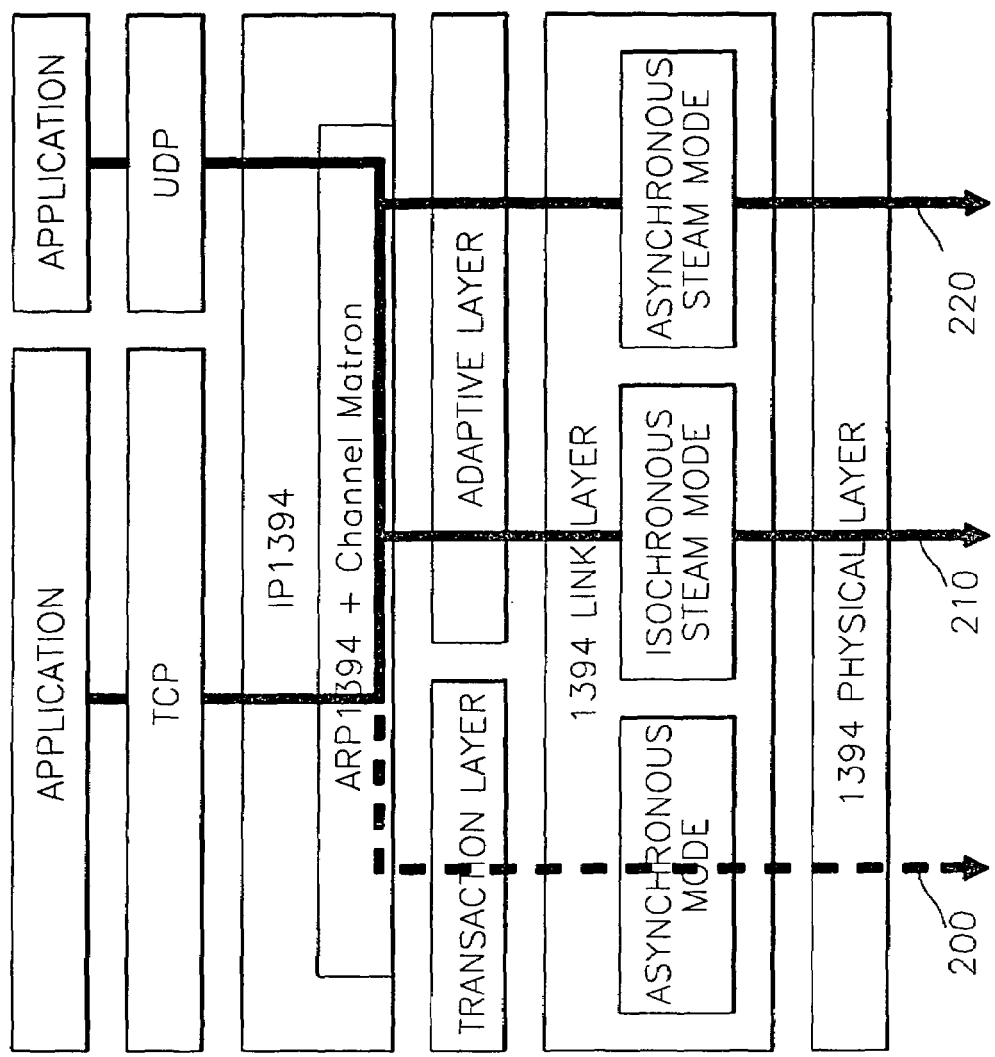
FIG. 2 shows a data communications protocol stack and data flow therein in order to describe a method for matching an upper protocol layer to a high speed serial bus according to the present invention.
Figure 3:
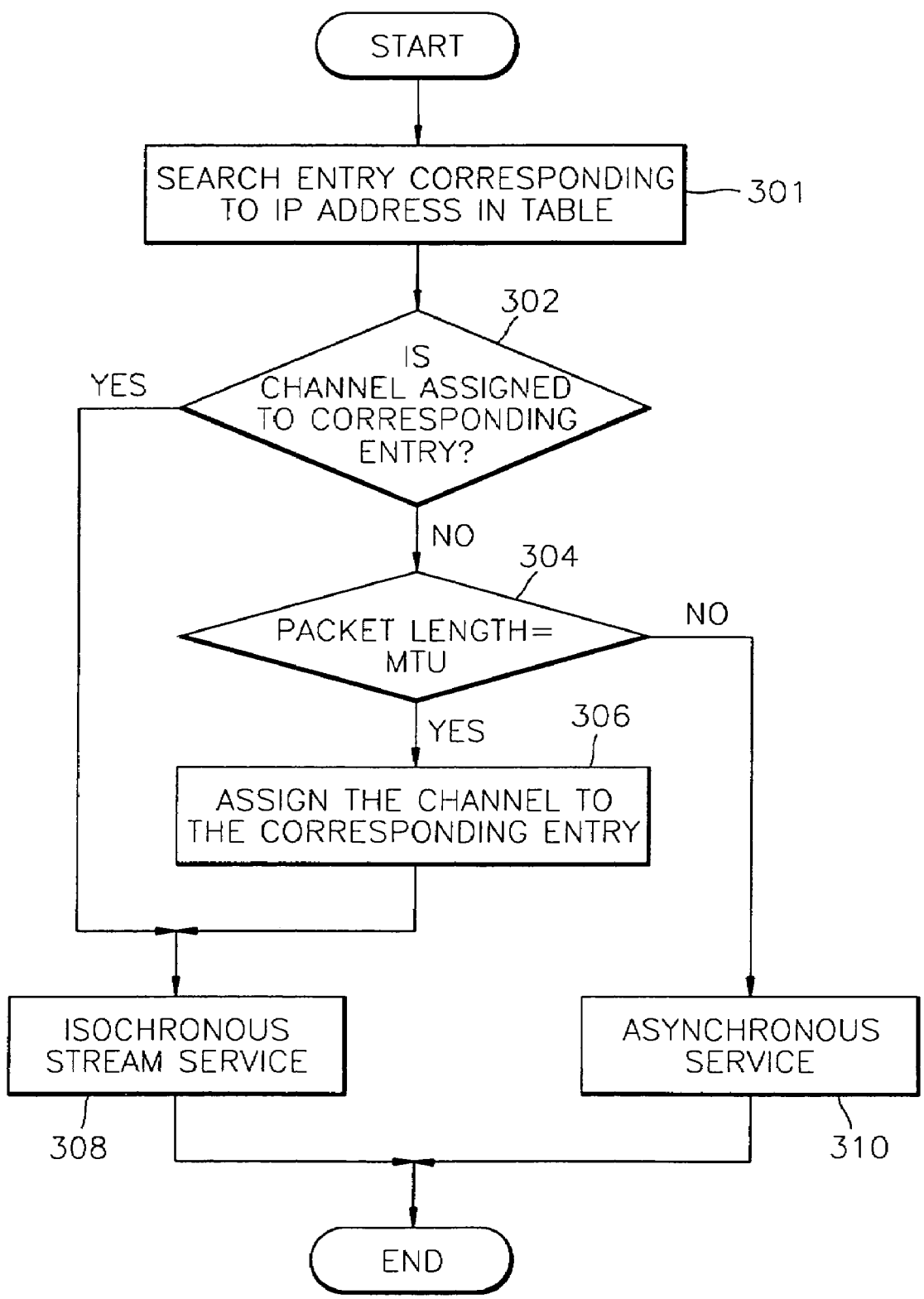
FIG. 3 is a flowchart illustrating the main steps of a method for matching an upper protocol layer to a high speed serial bus according to an embodiment of the present invention.

FIG. 2 shows a data communications protocol stack and data flow therein in order to describe a method for matching an upper protocol layer to a high speed serial bus according to the present invention. FIG. 3 is a flowchart illustrating the main steps of a method for matching an upper protocol layer to a high speed serial bus according to an embodiment of the present invention.

The method for matching the upper protocol layer to the high speed serial bus according to the present invention is performed in the IP 1394 layer which is a kind of a media access control (MAC) layer. The IP 1394 layer controls data transfer so as to effectively utilize the transfer method of the IEEE 1394 serial bus. The IP 1394 layer includes a kind of data transfer control layer which is called "Channel Matron" or "Matron" hereinafter and an address resolution protocol (ARP) 1394 layer.

Data transferred from an application is transferred to the IP 1394 layer through a TCP layer or a UDP layer. The IP 1394 layer discriminates the data transferred through the TCP layer or the UDP layer. The transferred data is in the form of packets. The data in the form of packets includes an IP address as a destination address. In order to perform the matching method according to the present invention, the IP 1394 includes an information storing unit called a Matron note in which channel information is stored. Entry information including information items recorded in a "destination address" field, a "status" field, a time to live (TTL)" field, and a "channel number" field is recorded in the Matron note. The "destination address" field holds the destination address of the transferred data packet. The destination address is information for identifying data transfer flow in a system, such as a port address or a session number. The "status" field represents the status of entry which can be expressed as 'valid', 'invalid', and 'channel_invalid'. A 'valid' status indicates that the transferred data packet is stream data. 'Invalid' indicates that the corresponding entry itself is invalid. 'channel_invalid' indicates that the packet is transferred by asynchronous transfer. The "TTL" field represents the period of time during which the entry stays in the Matron_note. The "channel number" field represents the channel number allocated during the transfer of the stream data. The Matron searches the entry corresponding to the IP address in the Matron note using the IP address of the data packet when the data packet is received from the application (step 300).

In step 302, a determination is made as to whether a channel is allocated to the corresponding entry. When it is determined that the channel is allocated to the corresponding entry in the step 302, the Matron reads stored channel information and transfers data to the channel corresponding to the channel information. In this case, the data transfer to a specific node is matched to the IEEE 1394 bus in the application and the isochronous transfer is performed. Also, in this case, the channel is allocated to the entry corresponding to the IP address of the data packet output from the application. When the channel is allocated to the corresponding entry, the isochronous stream service is continuously performed (step 308).

Since a general communications application such as the Internet is not matched to the IEEE 1394 bus, the channel is not allocated to the entry corresponding to the IP address of the data packet output from such a communications application. When it is determined that the channel is not allocated to the corresponding entry in the step 302, the Matron checks whether the length of the data packet received from the upper protocol layer is no less than a maximum transfer unit (MTU). Since the length of the packet does not exceed the MTU, a determination is made as to whether the length of the packet is equal to or less than the MTU (step 304). For example, in the case of the TCP/IP protocol, since the MTU is 1500 bytes, it is checked whether the length of the packet is 1500 bytes. Namely, when the length of the packet data transferred to a predetermined node is 1500 bytes, the data packet is determined to be the stream data which forms flow for performing the stream service.

When the data packet is determined to be the stream data, the Matron allocates a channel and bandwidth to a corresponding entry (step 306) and performs the isochronous stream service using the allocated channel (refer to the data flow 210 of FIG. 2) (step 308). The channel allocation is performed considering the available bandwidth of the bus.

Alternatively, when a task related to multicast or broadcast is to be performed, the steps 306 and 308 can be respectively replaced by the step of the 1394 link layer allocating the channel and the step of the 1394 link layer performing an asynchronous stream service (refer to the data flow 220 of FIG. 2). In this case, the channel is allocated. However, bandwidth is not allocated.

When it is determined that the data transferred through the bus is less than the MTU, the channel is not allocated and the data is transferred by the asynchronous transfer method supported by the IEEE 1394 standard. Namely, in a transaction layer and the 1394 link layer, the transfer data is transformed into the form of the asynchronous packet suitable for the IEEE 1394 standard. The 1394 physical layer transfers the transformed asynchronous packet to the bus (refer to the data flow 200 of FIG. 2).

The data transferred to the IP 1394 layer is transferred to the link layer through the transaction layer or an adaptive layer. The data transferred to the link layer is transferred to the 1394 bus through the physical layer.

Also, although the data flow is formed through the allocated channel, it is more preferable to periodically check the packet transfer rate and the bandwidth of the bus and to reallocate the bandwidth with respect to a channel or to return the allocated channel.

Figure 4:
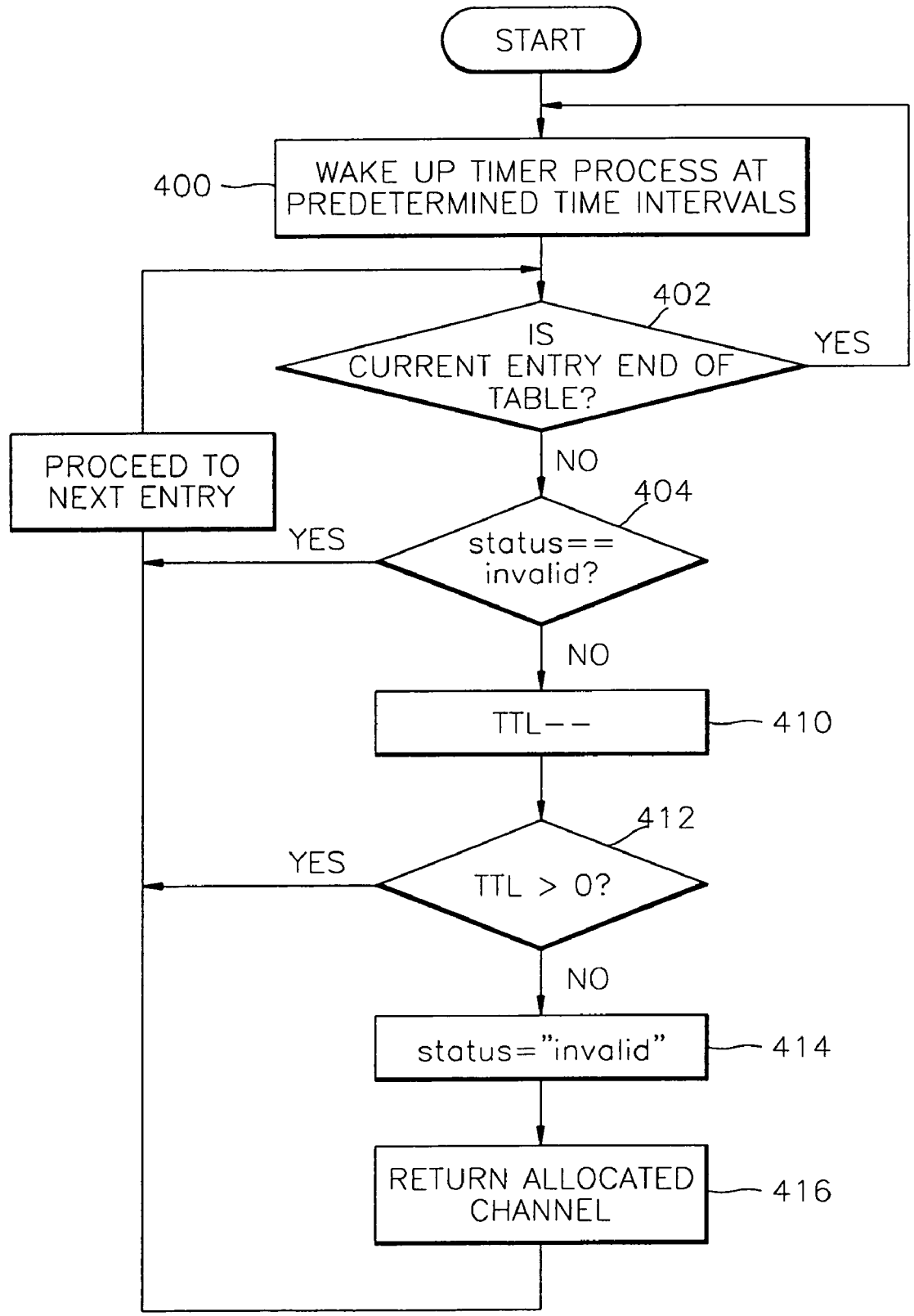
FIG. 4 is a flowchart illustrating the main steps of a table managing process required for performing the method of FIG. 3.

In order to perform the above data transfer on the high speed serial bus based on the IEEE 1394, the table managing process shown in FIG. 4 is performed. Referring to FIG. 4, according to the table managing process for performing the method for matching the upper protocol layer to the high speed serial bus according to the present invention, a timer process is woken up at a uniform time intervals (step 400). After waking up the timer process, a determination is made as to whether the current entry corresponds to the end of the Matron note (step 402). When the entry corresponds to the end of the Matron note, the timer process sleeps and wakes up after the lapse of a certain time. When the entry does not correspond to the end of the Matron note, the "status" field which displays the status of the entry is read and the "status" field is checked to determine whether it is 'invalid' (step 404). When the "status" field is 'invalid', the step 402 is performed with respect to a next entry (step 406). If the "status" field is not 'invalid', the value of the time-to-live (TTL) is decreased (step 410) and a determination is made as to whether the value is larger than 0 (step 412). If the value is not larger than 0, since the entry corresponding to the packet transferred to the Matron note does not exist, the "status" field is transited to the 'invalid' status (step 414) and the allocated channel is returned (step 416).

In this specific embodiment, a determination is made as to whether the length of the data packet received from the upper protocol layer is no less than the MTU. However, it is possible to determine the data flow by checking whether the length of the data packet is no less than a predetermined length which is no more than the MTU. In this case, when the length of the data packet N is a positive number less than 1, a determination is made as to whether the length of the data packet is no less than N×MTU. When it is determined that the length of the data packet is no less than N×MTU, the data packet is determined to be the stream data. Accordingly, the channel of the bus is allocated and the data is transferred by the isochronous transfer method. If the length of the data packet is less than N×MTU, it is determined that the data packet is not the stream data. Accordingly, the data is transferred by the asynchronous transfer method.

Also, alternatively, it is possible to determine the data flow by checking whether the data packet whose length corresponds to the MTU is received no less than a predetermined number of times for a predetermined time. In this case, a determination is made as to whether the data packet whose length corresponds to the MTU is received from the upper layer to a predetermined node no less than a predetermined number of times for a predetermined time. When it is determined that the data packet whose length corresponds to the MTU is received no less than a predetermined number of times for a predetermined time, the input data is determined to be the stream data. Accordingly, the channel of the bus is allocated and the data is transferred by the isochronous transfer method. Meanwhile, when it is determined that the data packet whose length corresponds to the MTU is received less than a predetermined number of times for a predetermined time, it is determined that the input data is not the stream data. Accordingly, the data is transferred by the asynchronous transfer method. Also, more preferably, when it is determined that the data packet whose length corresponds to the MTU is received less than a predetermined number of times for a predetermined time, it is determined that the input data is not the stream data. Accordingly, the channel is returned and the data is transferred in the asynchronous transfer method.

According to the matching method of the present invention, it is possible to easily classify the packets. Accordingly, it is possible to effectively match an existing communications application where it is not specified which service of the IEEE 1394 is to be used to the IEEE 1394 and to effectively use the channel by selecting an appropriate transfer method according to the data flow where very small load is put on a system since it is easy to classify packets.

The embodiment of the present invention can be created to be a program which can be executed by computers. The invention may be embodied in general-purpose digital computers by reading and running the program from computer readable media. The media may be storage media such as ROMs, magnetic storing media such as floppy disks, hard disks, optically readable media such as CD-ROMs and DVDs, and carrier waves such as transfer through the Internet.

The reading media store a program code which can execute the steps of (a) checking whether the length of the packet transferred from the upper layer to the node of the high speed serial bus is no less than a predetermined length; (b) allocating the channel of the bus and transferring data by the isochronous transfer service when it is determined that the length of the packet is no less than a predetermined length; and (c) transferring the data by the asynchronous transfer service when it is determined that the length of the packet is less than a predetermined length, in computers.

Functional programs, codes, and code segments for realizing the present invention can be easily referred to by programmers in the technical field to which the present invention belongs.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for matching an upper protocol layer to a high speed serial bus, comprising the steps of:
 (a) checking whether the length of a packet transferred from an upper layer to a node of the high speed serial bus is no less than a predetermined length;
 (b) allocating a channel of the bus and transferring data through the channel by an isochronous transfer service when it is determined that the length of the packet is no less than a predetermined length in the step (a); and
 (c) transferring the data by an asynchronous transfer service when it is determined that the length of the packet is less than a predetermined length in the step (a);
 determining whether a channel is allocated to an entry information of said packet, wherein said step of checking whether the length of said packet is no less than a predetermined length is performed if no channel is allocated based on said entry information of said packet.

2. The method of claim 1, wherein the predetermined length is a maximum transfer unit (MTU) defined by the TCP/IP protocol in the step (a).

3. The method of claim 2, wherein the step (a) is performed by the IP 1394 layer and the IP 1394 layer comprises a channel Matron for performing the step (a) and an address resolution protocol (ARP) 1394 layer.

4. The method of claim 2, wherein the high speed serial bus meets the requirements of the IEEE 1394 standard.

5. The method of claim 1, wherein the step (a) is performed in the IP 1394 layer and the IP 1394 layer comprises a channel Matron for performing the step (a) and an address resolution protocol (ARP) 1394 layer.

6. The method of claim 5, wherein the high speed serial bus meets the requirements of the IEEE 1394 standard.

7. The method of claim 1, wherein the high speed serial bus meets the requirements of the IEEE 1394 standard.

8. A method for matching an upper protocol layer to a high speed serial bus, comprising the steps of:
(a) determining whether the length of a data packet transferred from an upper layer to a node of the high speed serial bus is no less than N×MTU wherein N is a positive number which is smaller than 1 and MTU is the maximum transfer unit defined by the TCP/IP protocol;
(b) determining that the data packet is stream data, allocating a channel of the bus, and transferring data by an isochronous transfer method when it is determined that the length of the data packet is no less than N×MTU; and
(c) determining that the data packet is not the stream data and transferring data by an asynchronous transfer method when it is determined that the length of the data packet is less than N×MTU;
determining whether a channel is allocated to an entry information of said packet, wherein said step of checking whether the length of said packet is no less than a predetermined length is performed if no channel is allocated based on said entry information of said packet.

9. The method of claim 8, wherein the step (a) is performed by the IP 1394 layer and the IP 1394 layer comprises a channel Matron for performing the step (a) and an address resolution protocol (ARP) 1394 layer.

10. The method of claim 9, wherein the high speed serial bus meets the requirements of the IEEE 1394 standard.

11. The method of claim 8, wherein the high speed serial bus meets the requirements of the IEEE 1394 standard.

12. A method for matching an upper protocol layer to a high speed serial bus, comprising the steps of:
(a) determining whether a data packet whose length is a MTU is received from an upper layer to a predetermined node no less than a predetermined number of times for a predetermined time;
(b) determining that input data is stream data, allocating the channel of the bus, and transferring data by an isochronous transfer method when it is determined that the data packet whose length is the MTU is received no less than the predetermined number of times for the predetermined time in the step (a); and
(c) determining the input data is not the stream data and transferring the data by an asynchronous transfer method when it is determined that the data packet whose length is the MTU is received less than the predetermined number of times for the predetermined time in the step (a).

13. The method of claim 12, further comprising the step of determining the input data is not the stream data, returning the allocated channel, and transferring the data by the asynchronous transfer method when it is determined that the data packet whose length is the MTU is received less than the predetermined number of times for the predetermined time in the step (a).

14. The method of claim 13, wherein the step (a) is performed by the IP 1394 layer and the IP 1394 layer comprises a channel Matron for performing the step (a) and an ARP 1394 layer.

15. The method of claim 14, wherein the high speed serial bus meets the requirements of the IEEE 1394 standard.

16. The method of claim 13, wherein the high speed serial bus meets the requirements of the IEEE 1394 standard.

17. The method of any one of claim 1, 8 or 12, wherein in order to perform the data transfer on the high speed serial bus, a table managing process is performed, the process comprising steps of:
(a) waking up a timer process at predetermined time intervals;
(b) checking whether the current entry corresponds to the end of a Matron note;
(c) letting the timer process sleep when the entry corresponds to the end of a Matron note and waking up the timer process after the lapse of a predetermined time;
(d) reading a status field which displays the status of the entry and checking whether the status field is in an invalid state when the entry does not correspond to the end of the Matron note;
(e) proceeding to a next entry when the status field is in the invalid state and jumping to the step (b);
(f) decreasing a time-to-live (TTL) value when the status field is not in the invalid state;
(g) determining whether the reduced TTL value is larger than 0; and
(h) transiting the status field to the invalid state and returning the allocated channel when it is determined that the TTL value is not larger than 0 in the step (g).

18. The method of claim 12, further comprising:
determining whether a channel is allocated to an entry information of said data packet,
wherein said step of determining whether said data packet is received from said upper layer to a predetermined node no less than a predetermined number of times is performed if no channel is allocated based on said entry information of said packet.

19. A method for matching an upper protocol layer to a high speed serial bus, comprising the steps of:
(1) determining whether the length of a data packet transferred from an upper layer to a node of the high speed serial bus is no less than N×MTU wherein N is a positive number which is smaller than 1 and MTU is the maximum transfer unit defined by the TCP/IP protocol;
(2) determining that the data packet is stream data, allocating a channel of the bus, and transferring data by an isochronous transfer method when it is determined that the length of the data packet is no less than N×MTU; and
(3) determining that the data packet is not the stream data and transferring data by an asynchronous transfer method when it is determined that the length of the data packet is less than N×MTU,
wherein in order to perform the data transfer on the high speed serial bus, a table managing process is performed, the process comprising steps of:
(a) waking up a timer process at predetermined time intervals;
(b) checking whether the current entry corresponds to the end of a Matron note;

(c) letting the timer process sleep when the entry corresponds to the end of a Matron note and waking up the timer process after the lapse of a predetermined time;

(d) reading a status field which displays the status of the entry and checking whether the status field is in an invalid state when the entry does not correspond to the end of the Matron note;

(e) proceeding to a next entry when the status field is in the invalid state and jumping to the step (b);

(f) decreasing a time-to-live (TTL) value when the status field is not in the invalid state;

(g) determining whether the reduced TTL value is larger than 0; and (h) transiting the status field to the invalid state and returning the allocated channel when it is determined that the TTL value is not larger than 0 in the step (g).

20. A method for matching an upper protocol layer to a high speed serial bus, comprising the steps of:

(1) determining whether the length of a data packet transferred from an upper layer to a node of the high speed serial bus is no less than N×MTU wherein N is a positive number which is smaller than 1 and MTU is the maximum transfer unit defined by the TCP/IP protocol;

(2) determining that the data packet is stream data, allocating a channel of the bus, and transferring data by an isochronous transfer method when it is determined that the length of the data packet is no less than N×MTU; and (3) determining that the data packet is not the stream data and transferring data by an asynchronous transfer method when it is determined that the length of the data packet is less than N×MTU, wherein in order to perform the data transfer on the high speed serial bus, a table managing process is performed, the process comprising steps of:

(a) waking up a timer process at predetermined time intervals;

(b) checking whether the current entry corresponds to the end of a Matron note;

(c) letting the timer process sleep when the entry corresponds to the end of a Matron note and waking up the timer process after the lapse of a predetermined time;

(d) reading a status field which displays the status of the entry and checking whether the status field is in an invalid state when the entry does not correspond to the end of the Matron note;

(e) proceeding to a next entry when the status field is in the invalid state and jumping to the step (b);

(f) decreasing a time-to-live (TTL) value when the status field is not in the invalid state;

(g) determining whether the reduced TTL value is larger than 0; and (h) transiting the status field to the invalid state and returning the allocated channel when it is determined that the TTL value is not larger than 0 in the step (g).

* * * * *